(12) United States Patent
Maruyama et al.

(10) Patent No.: US 7,731,173 B2
(45) Date of Patent: Jun. 8, 2010

(54) METHOD OF SEPARATING PLATE MEMBER

(75) Inventors: Manabu Maruyama, Tochigi (JP); Yoshiaki Nakagawa, Tochigi (JP); Keiichiro Nakao, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 170 days.

(21) Appl. No.: 11/816,180

(22) PCT Filed: Feb. 13, 2006

(86) PCT No.: PCT/JP2006/302476

§ 371 (c)(1),
(2), (4) Date: Aug. 14, 2007

(87) PCT Pub. No.: WO2006/085652

PCT Pub. Date: Aug. 17, 2006

(65) Prior Publication Data

US 2009/0008864 A1 Jan. 8, 2009

(30) Foreign Application Priority Data

Feb. 14, 2005 (JP) ............................... 2005-036450

(51) Int. Cl.
*B65H 3/30* (2006.01)
(52) U.S. Cl. ............................ 271/20; 271/91; 271/93; 271/98; 271/105; 271/106
(58) Field of Classification Search .................. 271/20, 271/90, 91, 93, 98, 106, 105
See application file for complete search history.

(56) References Cited

U.S. PATENT DOCUMENTS 6,345,818 B1 * 2/2002 Stephan et al. ................ 271/91
6,739,588 B2 * 5/2004 Koster et al. ................. 271/106
6,886,827 B2 * 5/2005 Dachtler ...................... 271/106
7,044,056 B2 * 5/2006 Miyoshi ...................... 101/477
7,293,767 B2 * 11/2007 Shibabuki et al. ........... 271/106
7,604,231 B2 * 10/2009 Yuen et al. ................... 271/106
2002/0070494 A1 * 6/2002 Milillo et al. .................. 271/98
2002/0101027 A1 * 8/2002 Koster et al. ................. 271/106
2005/0002774 A1 * 1/2005 Trilk et al. ................ 414/796.5
2005/0217524 A1 * 10/2005 Miyoshi ...................... 101/477

FOREIGN PATENT DOCUMENTS

JP 47-31374 11/1972
JP 61-229731 10/1986

(Continued)

*Primary Examiner*—Patrick Mackey
*Assistant Examiner*—Jeremy Severson
(74) *Attorney, Agent, or Firm*—Rankin, Hill & Clark LLP

(57) ABSTRACT

A method which is capable of completely separating a plate member with a large area without using a peeling member and eliminating a possibility of permanent deformation on the plate member. A plurality of suction pads are suckingly disposed on a surface of a topmost plate member in a substantially lattice shape. Then, while the topmost plate member is held by the suction pads disposed in a zigzag shape among the suction pads disposed in the substantially lattice shape, the topmost plate member is lifted by the remaining suction pads. Finally, the suction pads holding the topmost plate member are lifted.

19 Claims, 14 Drawing Sheets

FOREIGN PATENT DOCUMENTS

| | | |
|---|---|---|
| JP | 2-135549 | 11/1990 |
| JP | 4-39225 | 2/1992 |
| JP | 306030 | 11/1993 |
| JP | 6-179534 | 6/1994 |
| JP | 6-263275 | 9/1994 |
| JP | 2001-252732 | 9/2001 |

* cited by examiner

METHOD OF SEPARATING PLATE MEMBER

TECHNICAL FIELD

The present invention relates to a method of separating a topmost plate member from laminated plate members.

BACKGROUND ART

In pressing process, a topmost plate member is separated from laminated plate members to be supplied to a press forming machine. It is general to separate the plate members by lifting the topmost plate member by a suction pad. However, the laminated plate members are coated with an oil lubricant having a high viscosity, a rust preventing oil, or the like and are brought into close contact with each other by their own weight. Therefore, it is difficult to completely separate the plate members by such a method and there is a case of simultaneously lifting up a plurality of sheets of plate members. When the plurality of sheets of plate members are taken, the plurality of sheets of plate members are simultaneously supplied to the press forming machine and destroying a die is a concern.

Hence, a method of separating plate members as shown by FIG. 14 is adopted. According to the method, there are used a plurality of pieces of air cylinders 50 each attached with a suction pad 51 at a front end of an output rod 50a. First, the suction pads 51 are arranged substantially in a lattice shape to be adsorbed onto a surface of a laminated topmost plate member W. Next, while pressing the topmost plate member W by the suction pad 51 on a center side of the plate member W, the topmost plate member W is lifted by the remaining suction pad 51. Then, both side edges of the topmost plate member W are rolled up. In the drawing, the air cylinder 50 to be contracted is painted in gray color. Finally, the topmost plate member W is separated by lifting the suction pad 51 on the center side. A method similar thereto is described in Patent Reference 1.

Further, in order to completely separate the plate member W, there is a case of also using the following method. That is, an oil film between the plate members W is removed by lifting the suction pad 51 while blowing air to a gap between the plate members W from a pipe 52. Further, by engaging an end edge of the lifted plate member W by an exfoliating member 53, the plate member W is elastically deformed to promote to separate the plate member W.

Further, there is also proposed a method of forming a gap between plate members by laminating the plate members provided with recesses and projections and lifting the topmost plate member by a suction pad while blowing air from the gap (Patent Reference 2).

Patent Reference 1: JP-A-06-263275

Patent Reference 2: JP-A-04-39225

DISCLOSURE OF THE INVENTION

Problems that the Invention is to Solve

However, in the former method, when an area of the plate member W is enlarged, the plate member W is incompletely separated and a plurality of sheets of the plate member W are liable to be taken. This is because when the suction pads 51 on the both sides are lifted, only a peripheral edge portion of the topmost plate member W is lifted by the suction pads 51, and therefore, when the area of the plate member W is enlarged, a hermetically attached area of the topmost plate member W (an area of a portion of the topmost plate member W pressed to a second plate member by the suction pad 51 on the center side) is enlarged, and a force of sucking the top most plate member W is increased. Further, although there is conceivable a method of increasing an amount of rolling up by the suction pads 51 on the both sides by increasing a stroke of the air cylinder 50, the apparatus is large-sized and is not practical.

Further, when the exfoliating member 53 is used, the surface of the plate member W is liable to be damaged, cut chips of the plate member W are adhered to other plate member by the oil to cause to bring about a failed product.

On the other hand, according to the latter method, although the plate member is firmly separated, the plate members are laminated in a bent state, and therefore, a permanent set is produced at the plate member and there is a concern of pressing the plate member under the state.

In view of such a situation, it is an object of the invention to provide a method of separating a plate member capable of completely separating a plate member having a large area and without a concern of bringing about a permanent set at the plate member even when an exfoliating member is not used.

Means for solving the Problems

A first aspect of the invention for resolving the above-described problem is characterized in a method of separating a topmost plate member from laminated plate members, the method comprising a first step of arranging a plurality of adsorbing devices substantially in a lattice shape to be adsorbed to a surface of a topmost plate member, a second step in which while holding the topmost plate member by the adsorbing devices substantially in the lattice shape which are arranged in a zigzag shape, the topmost plate member is lifted by remaining ones of the adsorbing devices, and a third step of lifting the adsorbing devices holding the topmost plate member at the second step.

According to such a constitution, when the adsorbing devices lifts a peripheral edge portion of the topmost plate member, an air gap formed between the topmost plate member and the second plate member is progressed to a center of the plate member to make other adsorbing devices enable to lift the plate member at the second step. That is, the topmost plate member is lifted by the adsorbing devices arranged substantially in the lattice shape which are arranged in the zigzag shape to be deformed into a wavy shape.

As a result, lifted portions are produced not only at the peripheral edge portion of the plate member but also at the center portion of the plate member and a hermetically attached area of the topmost plate member is reduced. That is, a force of adsorbing the topmost plate member is reduced by that amount, and therefore, a force of lifting the plate member by remaining ones of the adsorbing devices is made to be small and the topmost plate member is completely separated at the third step.

It is preferable that in the second and the third steps, the plate member is lifted by the adsorbing devices by blowing warm wind to between the topmost plate member and a second one of the plate member.

According to such a constitution, the warm wind is blown to a gap between the topmost plate member and the second plate member, a dynamic viscosity of an oil film is reduced, the oil film is made to be easy to be removed, and therefore, the force of adsorbing the topmost plate member is reduced to promote the separation of the plate member.

It is preferable that previously, a first inclined face continuous to a lower face from an end face of the plate member is formed at a corner portion on a lower side, and a second inclined face continuous to an upper face from the end face of the plate member is formed at a corner portion on an upper side.

According to such a constitution, the warm wind flows to the air gap between the first inclined face of the upper side plate member and the upper face of the lower side plate member, the warm wind invades the gap between the plate members therefrom, and therefore, the plate members are further firmly separated.

A second aspect of the invention for resolving the above-described problem is characterized in a method of separating a topmost one from laminated plate members, the method comprising a first step of forming a first inclined face continuous to a lower face from an end face of a plate member at a corner portion on a lower side and forming a second inclined face continuous to an upper face from the end face of the plate member at a corner portion on an upper side, a second step of arranging adsorbing devices to be adsorbed to a center portion and both end portions of the topmost plate member, a third step in which warm wind is blown to the end face of the plate member and while holding the topmost plate member by the adsorbing devices arranged at the center portion of the plate member, the topmost plate member is lifted by remaining ones of the adsorbing devices, and a fourth step of lifting the adsorbing devices holding the topmost plate member at the third step while blowing the warm wind to the end face of the plate member.

According to such a constitution, the warm wind blown to the end face of the plate member invades an air gap between the first inclined face of the upper side plate member and the upper face of the lower side plate member and is going to lift the end portion of the upper side plate member. Further, the warm wind flows to an upper side along the second inclined face of the lower side plate member, impinges on the first inclined face of the upper side plate member and is going to lift the end portion of the upper side plate member. Further, when the both end portions of the topmost plate member are rolled up by the adsorbing devices, the warm wind invades the gap between the plate members therefrom and the gap is going to be enlarged. That is, the topmost plate member is lifted in a state of reducing the hermetically attached area of the plate member.

ADVANTAGE OF THE INVENTION

According to the first aspect of the invention, at the second step, the lifted portions of the topmost plate member are produced not only at the peripheral edge portion but also at the center portion, and the area of hermetically attaching the topmost plate member and the second plate member is reduced, and therefore, even when an area of the plate member is large, only the topmost plate member can firmly be separated without using an exfoliating member.

According to a second aspect of the invention, the warm wind is made to be easy to advance to the gap between the plate members, and therefore, the topmost plate member is lifted in a state of reducing the hermetically attached area of the plate member and the plate members are firmly separated.

DESCRIPTION OF THE REFERENCE NUMERALS AND SIGNS

Figure 1:
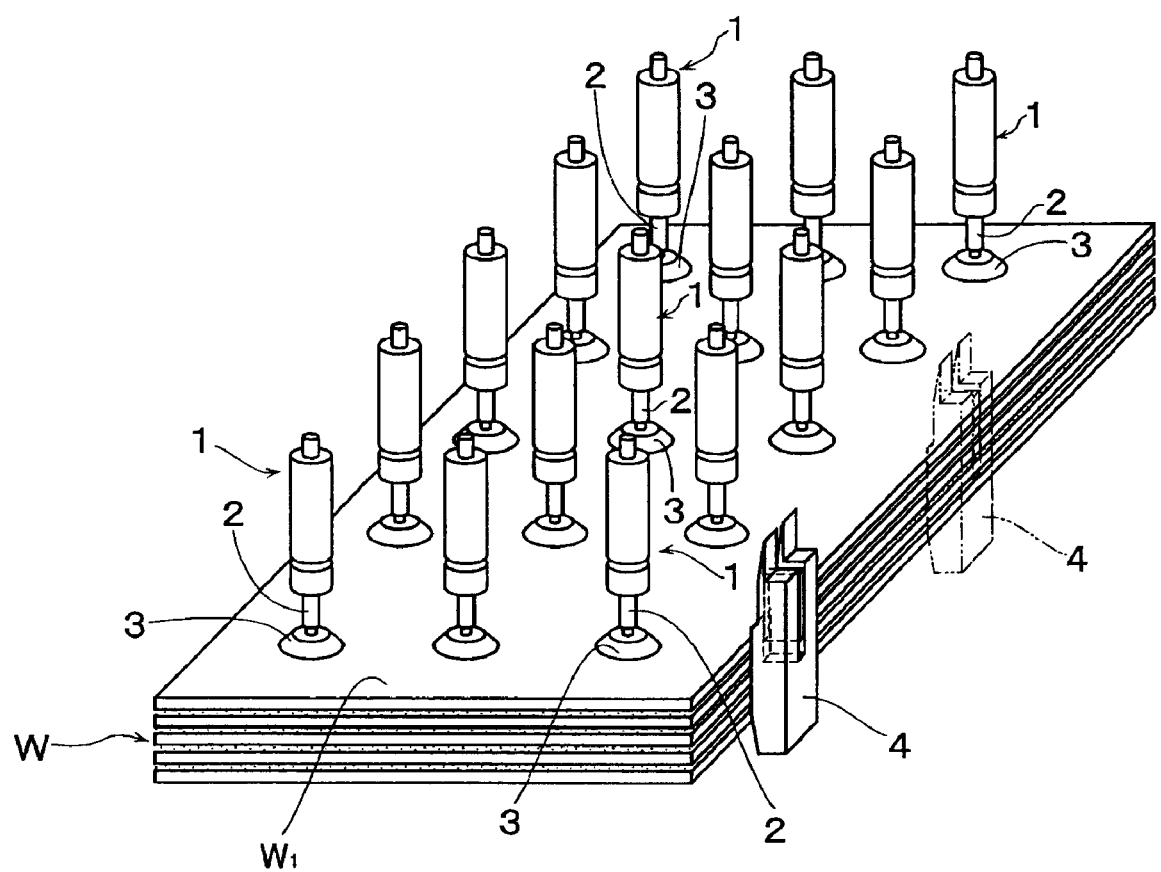
FIG. 1 is a view for explaining a first step of the invention.
Figure 2:
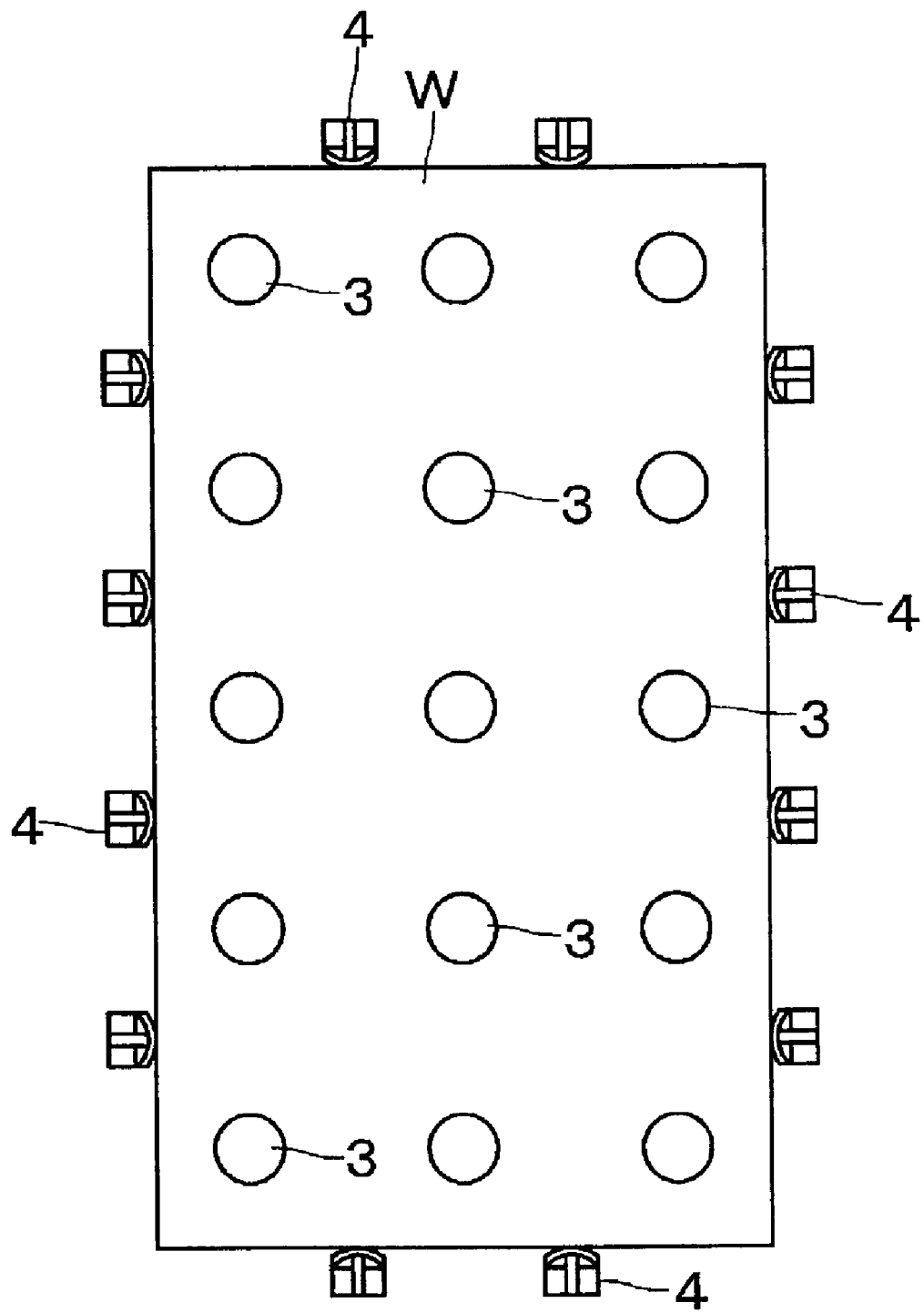
FIG. 2 is a view showing an arrangement of a suction pad and a guide member relative to a work.

1 . . . air cylinder
2 . . . output rod
3 . . . suction pad
4 . . . guide member
5 . . . warm wind injecting device
7 . . . first inclined face
8 . . . second inclined face
9 . . . gap

BEST MODE FOR CARRYING OUT THE INVENTION

An embodiment of the invention will be explained in details in reference to the attached drawings as follows.

FIG. 1 through FIG. 4 shows an apparatus used for carrying out the invention.

In the drawings, numeral 1 designates an air cylinder and a front end of an output rod 2 thereof is provided with a suction pad 3 as adsorbing device. The air cylinders 1 are attached to a carrying device (not illustrated) substantially in a lattice shape by making the output rods 2 vertical. Further, the carrying device is constituted movably in a horizontal and a vertical direction.

A plurality of guide members 4 are arranged at a surrounding of laminated plate members W. As shown by FIG. 4, the guide member 4 is provided with a guide face 4a brought into contact with end edges of the plate members W, and an upper side of the guide face 4a is arranged with a warm wind injecting device 5 constituted by arranging a number of nozzles in an up and down direction. The guide face 4a is bent, and therefore, brought into line contact with the end edges of the plate members W to be able to deal with various shapes of the plate members W. The guide members 4 are arranged to be confined to substantially centers among respective suction pads 3 in a longitudinal direction and a transverse direction of the plate members W (refer to FIG. 2). Further, in FIG. 1, only one of the guide members 4 is illustrated and illustration of remaining ones is omitted. The warm wind injecting device 5 is made to be offset from the guide face 4a by a distance L in order to improve an efficiency of blowing air to the plate members W. (refer to FIG. 3).

Next, an explanation will be given of a method of separating the plate members W by using the apparatus.

Figure 3:
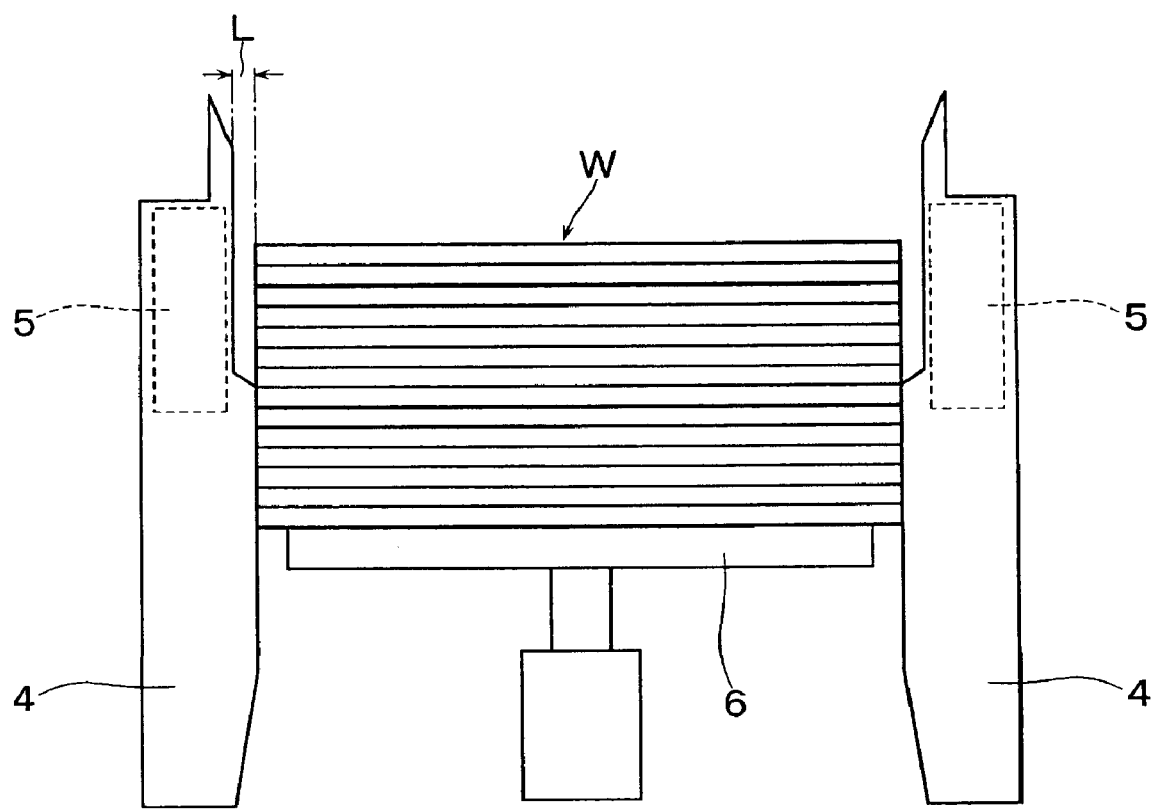
FIG. 3 is a view showing a state of positioning the work by the guide member.
Figure 4:
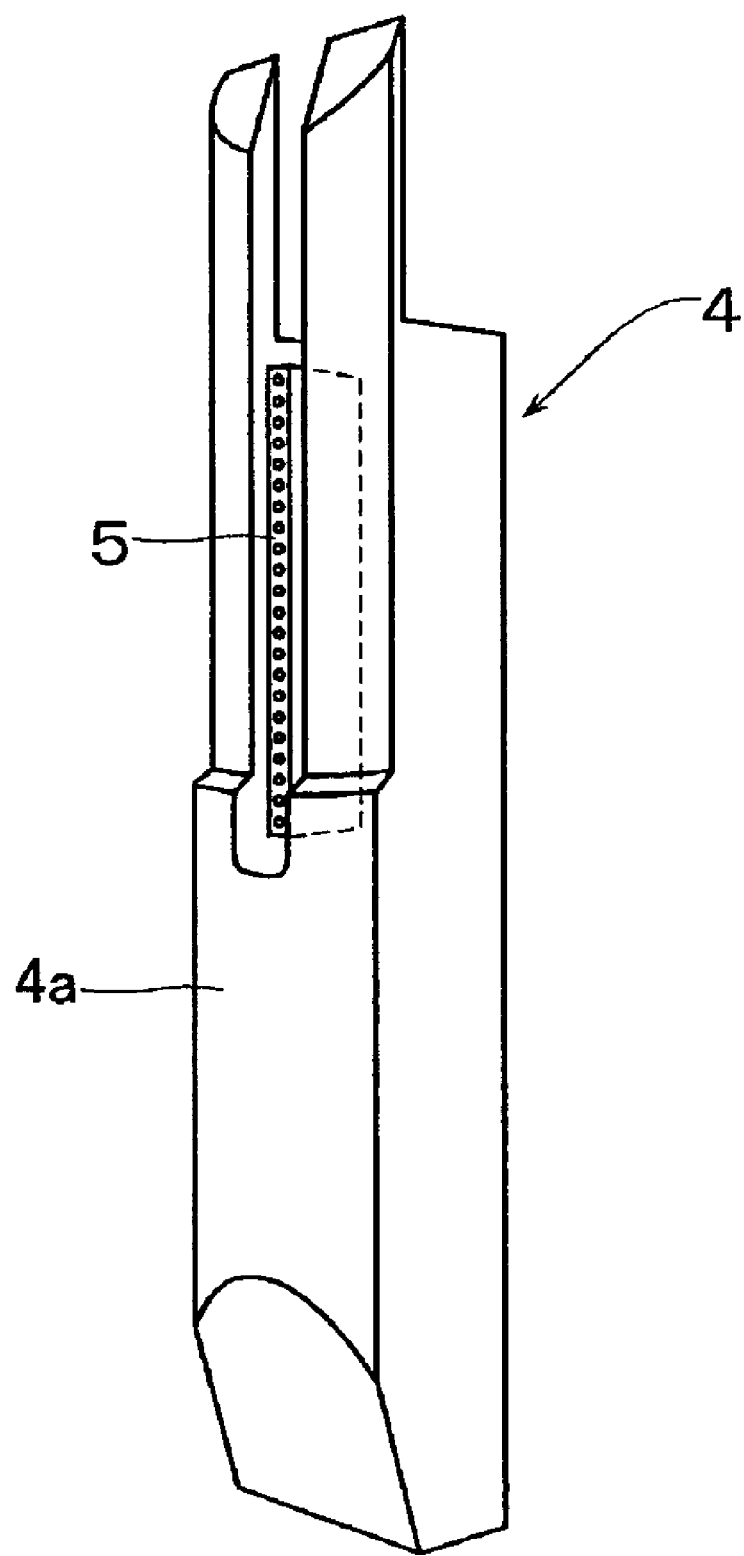
FIG. 4 is a perspective view of the guide member.

Previously, as shown by FIG. 3, the plate members W are laminated above a lifter 6, and the plate members W are positioned by pressing the guide faces 4a of the guide members 4 to end faces thereof. Further, the plate members W are lifted by the lifter 6 and warm wind is blown from the warm wind injecting device 5 to the end faces of the plate members W on an upper side. Further, at each time of removing the topmost plate member W, the plate members W are lifted by the lifter 6 and the warm wind is blown to the end faces of the plate members W on the upper side.

First, at a first step, the carrying device is moved to right above the laminated plate members W, the air cylinder 1 are expanded and the suction pads 3 are arranged substantially in the lattice shape to be adsorbed to a surface of the topmost plate member $W_1$ (refer to FIG. 1). That is, the suction pads are arranged on the surface of the topmost plate member $W_1$ in a state of being aligned both in the longitudinal and the transverse directions.

Figure 5:
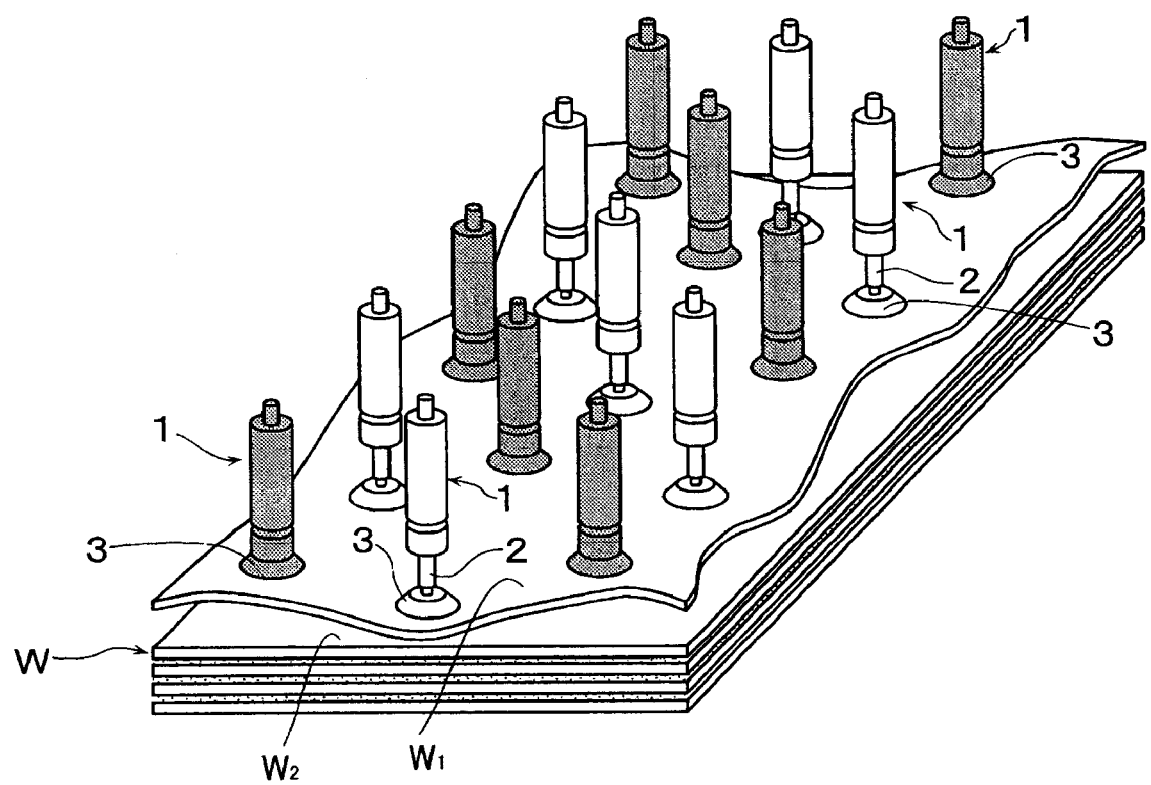
FIG. 5 is a view for explaining a second step of the invention.

At a second step shown in FIG. 5, the plurality of air cylinders 1 are contracted while blowing the warm wind to the end faces of the plate members W from the warm wind injecting device 5. Here, while holding the topmost plate member $W_1$ by the suction pads 3 arranged substantially in the lattice shape which are arranged in a zigzag shape, the topmost plate member $W_1$ is lifted by remaining ones of the sucking devices 3. In the drawing, the air cylinder 1 to be contracted is painted in gray color.

Figure 6:
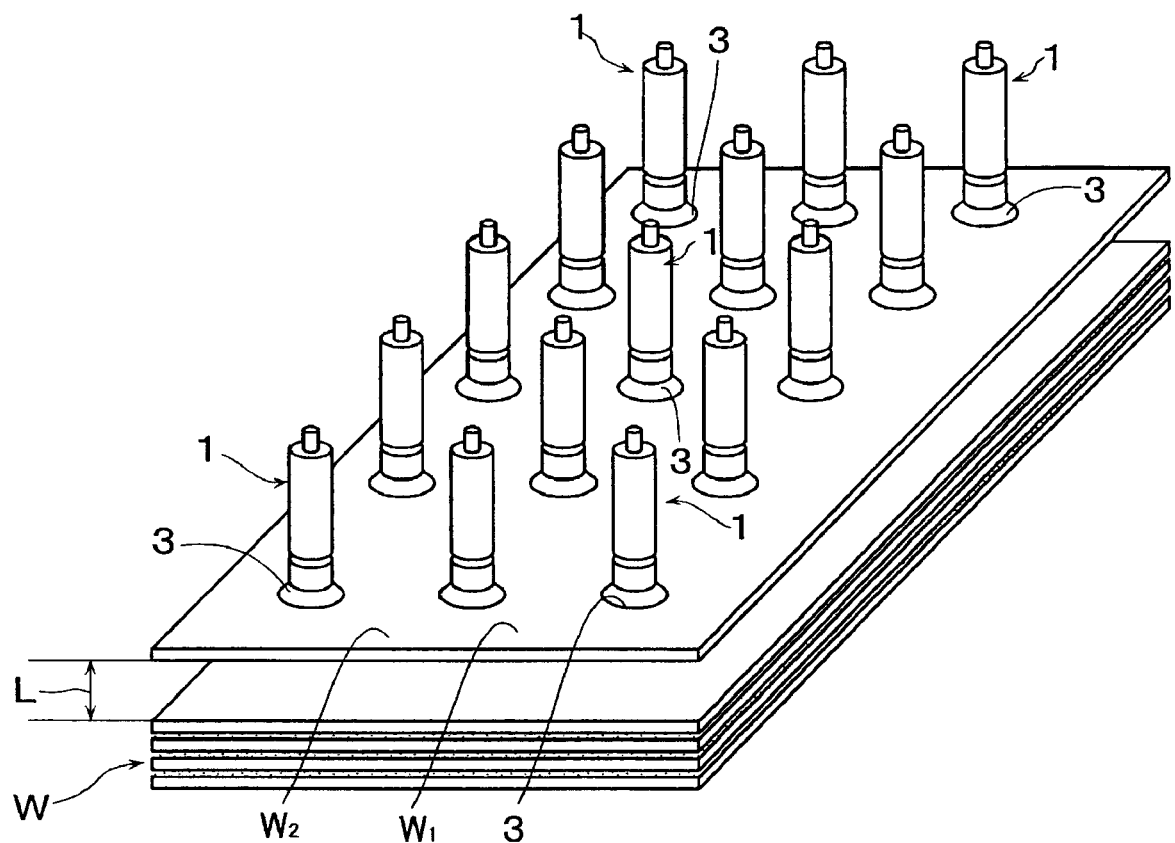
FIG. 6 is a view for explaining a third step of the invention.
Figure 7:
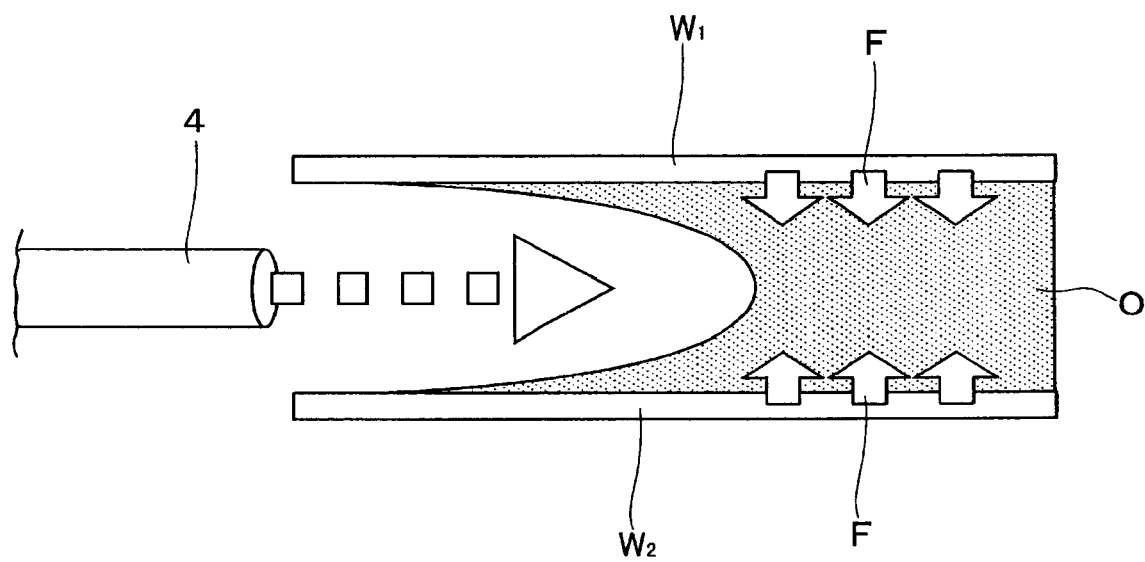
FIG. 7 is a view for explaining removal of an oil film by blowing warm wind.

At a third step shown in FIG. 6, while blowing the warm wind to the end faces of the plate members W from the warm wind injecting device 5, the suction pads 3 for holding the topmost plate member $W_1$ at the second step are lifted. As a result, the topmost plate member $W_1$ is lifted by a stroke L of the air cylinder 1 and is separated from a second plate member $W_2$. The separated topmost plate member $W_1$ is supplied to a press by the carrying device.

Figure 8:
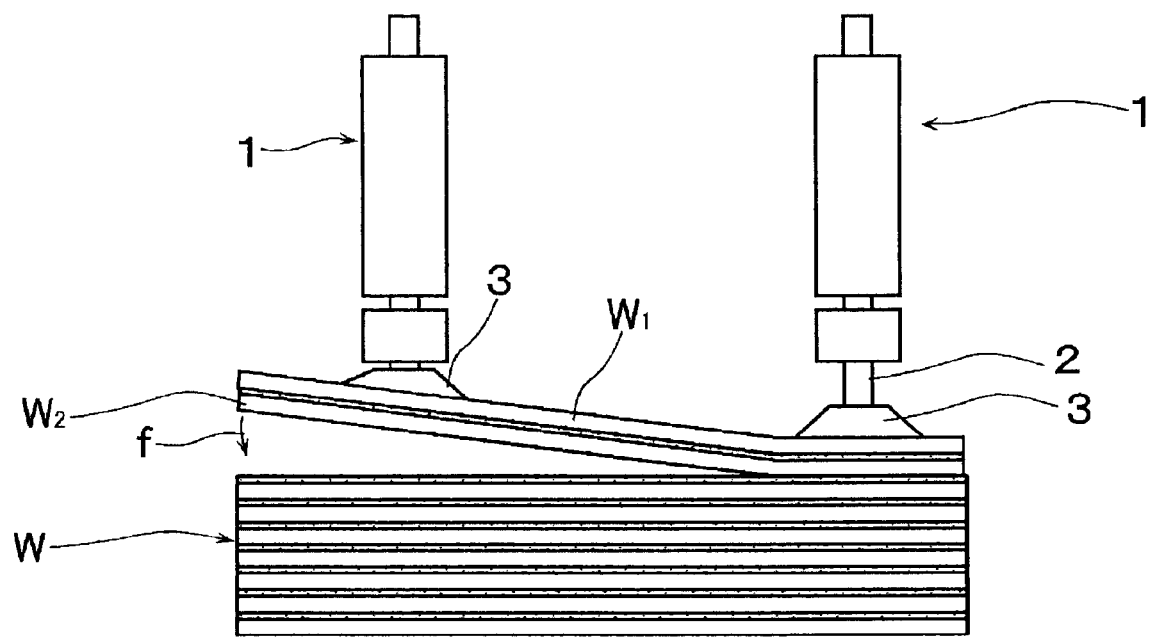
FIG. 8 is a view for explaining a principle of separating plate members at a second step.

Meanwhile, when a peripheral edge portion of the topmost plate member $W_1$ is lifted by the suction pads 3 at the second step, an air gap formed between the first plate member $W_1$ and the second plate member $W_2$ is progressed to the center of the plate member $W_1$ and the plate member $W_1$ is made to be able to be lifted by the other suction pads 3. That is, the topmost plate member $W_1$ is lifted and deformed in a wavy shape by the suction pads 3 arranged substantially in the lattice shape which are arranged in the zigzag shape. At that occasion, even when the second plate member $W_2$ is simultaneously lifted as shown by FIG. 8, the second plate member $W_2$ is separated from the topmost plate member $W_1$ by an elastic recovery force f.

As a result, there are brought about lifted portions not only at the peripheral edge portion of the plate member $W_1$ but also at the center portion of the plate member $W_1$, and a hermetically attached area of the topmost plate member $W_1$ is reduced. That is, a suction force of the topmost plate member $W_1$ is reduced by that amount, and therefore, at the third step, a force of lifting the plate member $W_1$ by the remaining suction pads 3 is made to be small, and the topmost plate member $W_1$ is completely separated. As a result, even when the area of the plate members W is large, only the topmost plate member $W_1$ can firmly be separated without using an exfoliating member.

Figure 9:
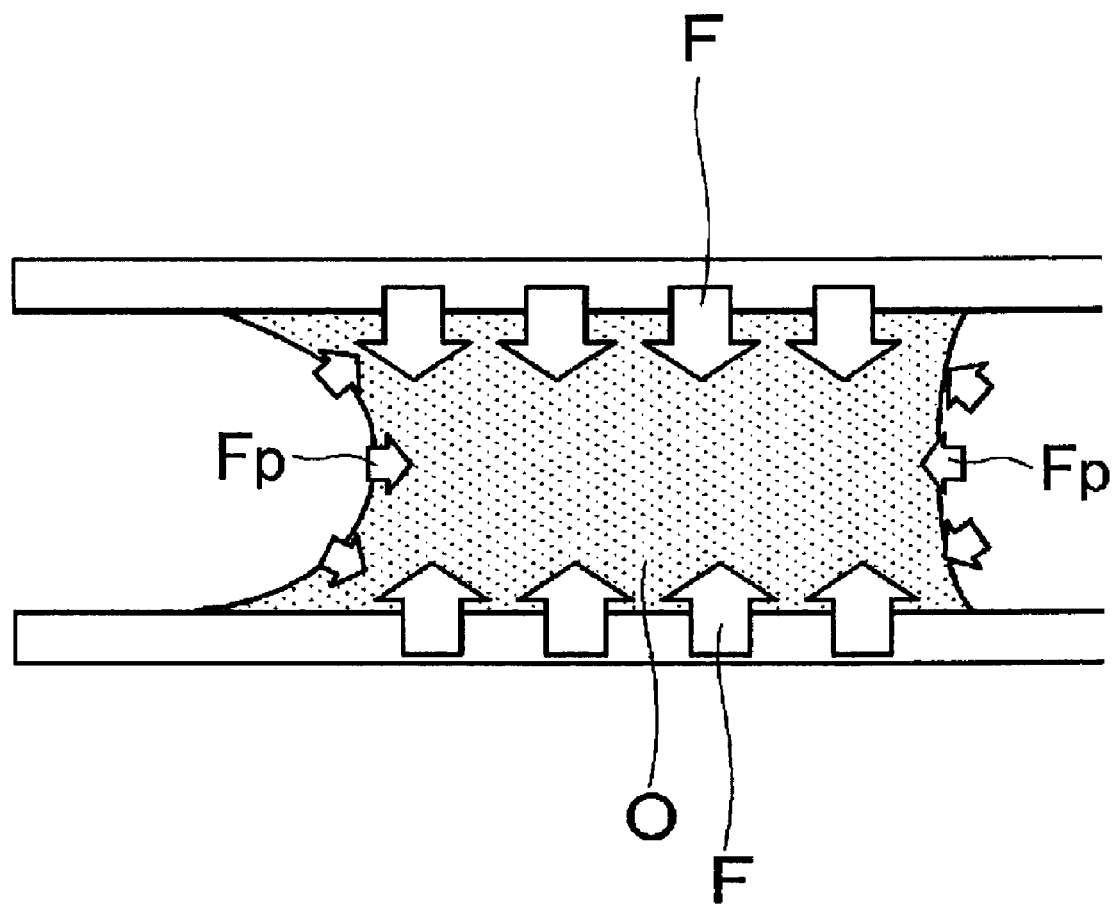
FIG. 9 is a view for explaining an adsorbing force brought about in a plate member.
Figure 10:
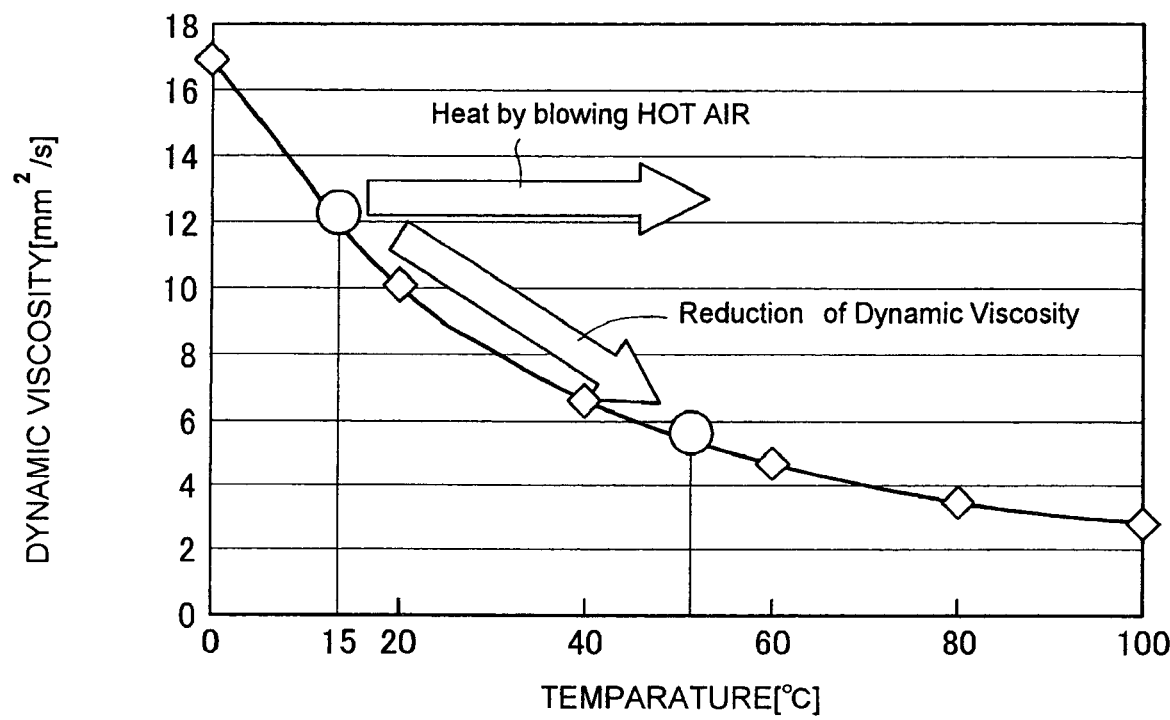
FIG. 10 is a diagram showing a relationship between a dynamic viscosity of an oil film and a temperature.

Further, at the second and the third steps, the plate member $W_1$ is lifted by the suction pads 3 while blowing the warm wind from the warm wind injecting device 5 to the gap between the topmost plate member $W_1$ and the second plate member $W_2$, and therefore, as show by FIG. 9, the warm wind is blown to the gap between the plate members $W_1$, $W_2$, a dynamic viscosity of an oil film o is reduced and the oil film o is made to be easy to be removed. Therefore, an adsorbing force F of the topmost plate member $W_1$ is reduced to promote the separation of the plate member $W_1$. FIG. 9 is a view for explaining a state of producing the suction force F at the plate members W by a surface tension Fp of the oil film o. FIG. 10 is a diagram showing a relationship between the dynamic viscosity of the oil film and a temperature.

Figure 11:
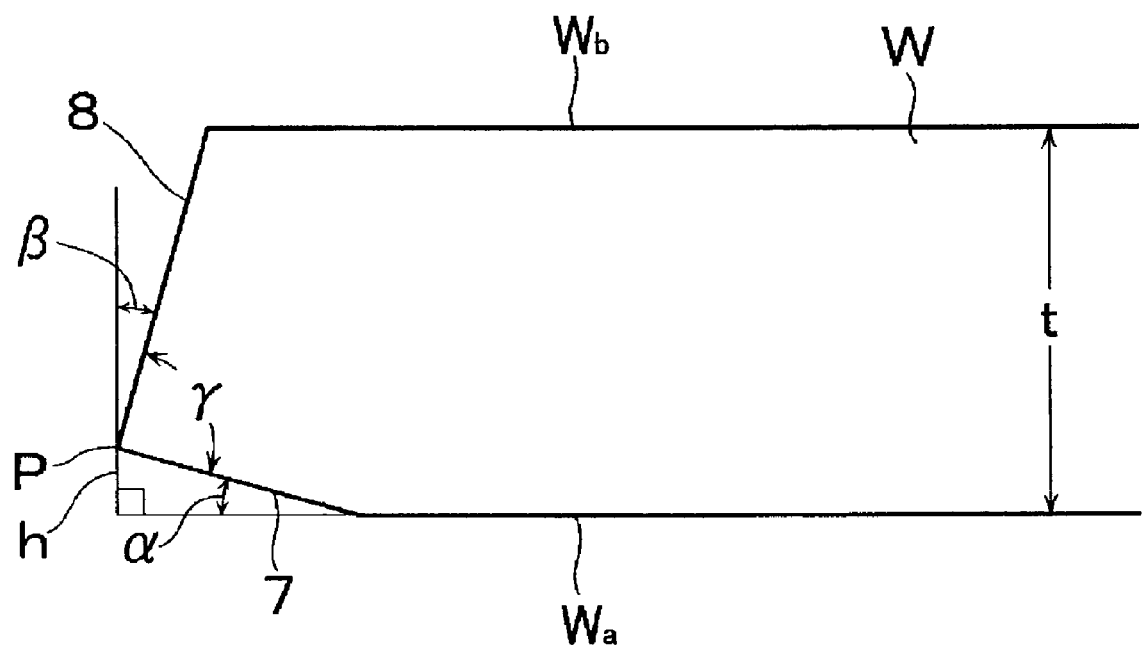
FIG. 11 is a view enlarging to show an end portion of the work.

Meanwhile, it is preferable to provide an inclined face as shown by FIG. 11. That is, a first inclined face 7 continuous to a lower face Wa from the end face of the plate member W is formed at a corner portion on a lower side, and a second inclined face 8 continuous to an upper face Wb from an upper end P of the first inclined face 7 is formed at a corner portion on an upper side. The inclined faces 7, 8 may be formed by cutting the upper and the lower corner portions of the plate member W, or may be formed by compressing the end portion of the plate member W. When the plate member W is a soft material such as aluminum, the first and the second inclined faces 7, 8 may be formed by compression.

Figure 13:
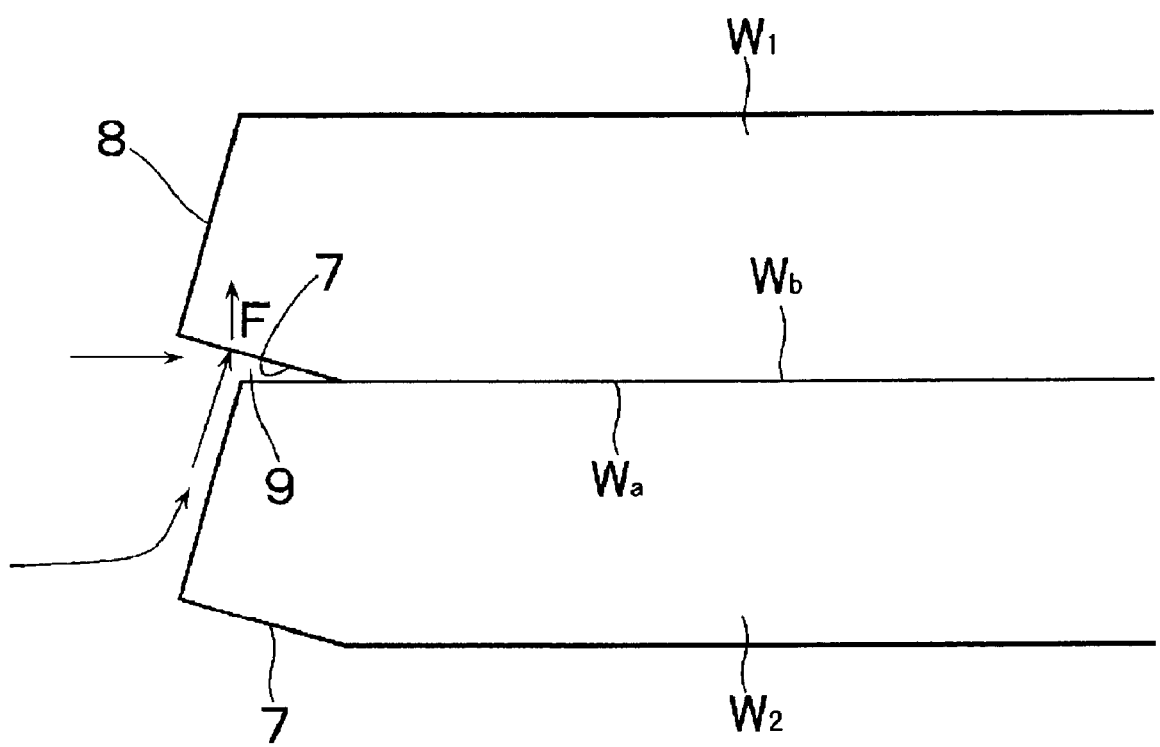
FIG. 13 is a view for explaining a force of air operated to the work.
Figure 14:
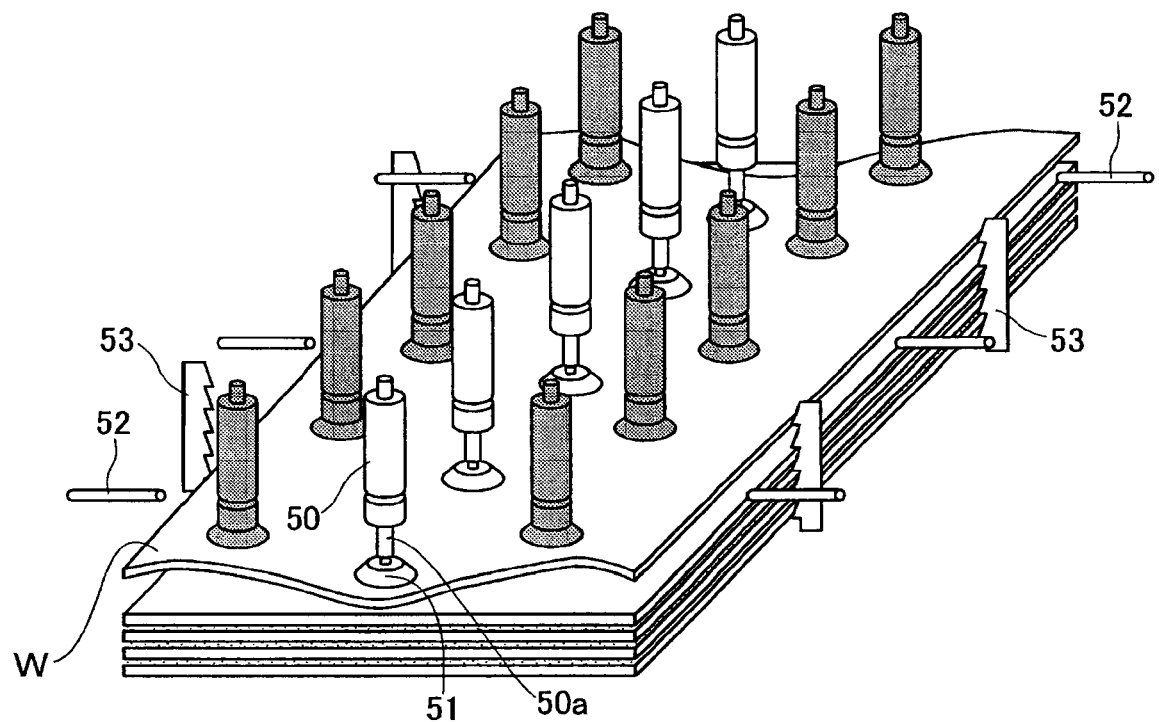
FIG. 14 is a view for explaining a background art method.

When the inclined faces 7, 8 are provided, the warm wind horizontally injected from the warm wind injecting device 5 invades an air gap 9 between the first inclined face 7 of the upper side plate member $W_1$ and the upper face Wa of the lower side plate member $W_2$ and is going to lift the end portion of the upper side plate member $W_1$ (refer to FIG. 13). Further, the warm wind flows to an upper side along the second inclined face 8 of the lower side plate member $W_2$, impinges on the first inclined face 7 of the upper side plate member $W_1$ and is going to lift the end portion of the upper side plate member $W_1$. That is, the end portion of the upper side plate member $W_1$ is operated with a lift up force F by the warm wind. Further, when the end portion of the topmost plate member $W_1$ is rolled up by the suction pads 3, the warm wind invades the gap between the plate members therefrom and the gap is enlarged. That is, the topmost plate member $W_1$ is lifted in a state of reducing the hermetically attaching area of the plate member. Therefore, even when the background art separating method shown in FIG. 14 is adopted, the plate members can be separated, there is no hazard practically.

Figure 12:
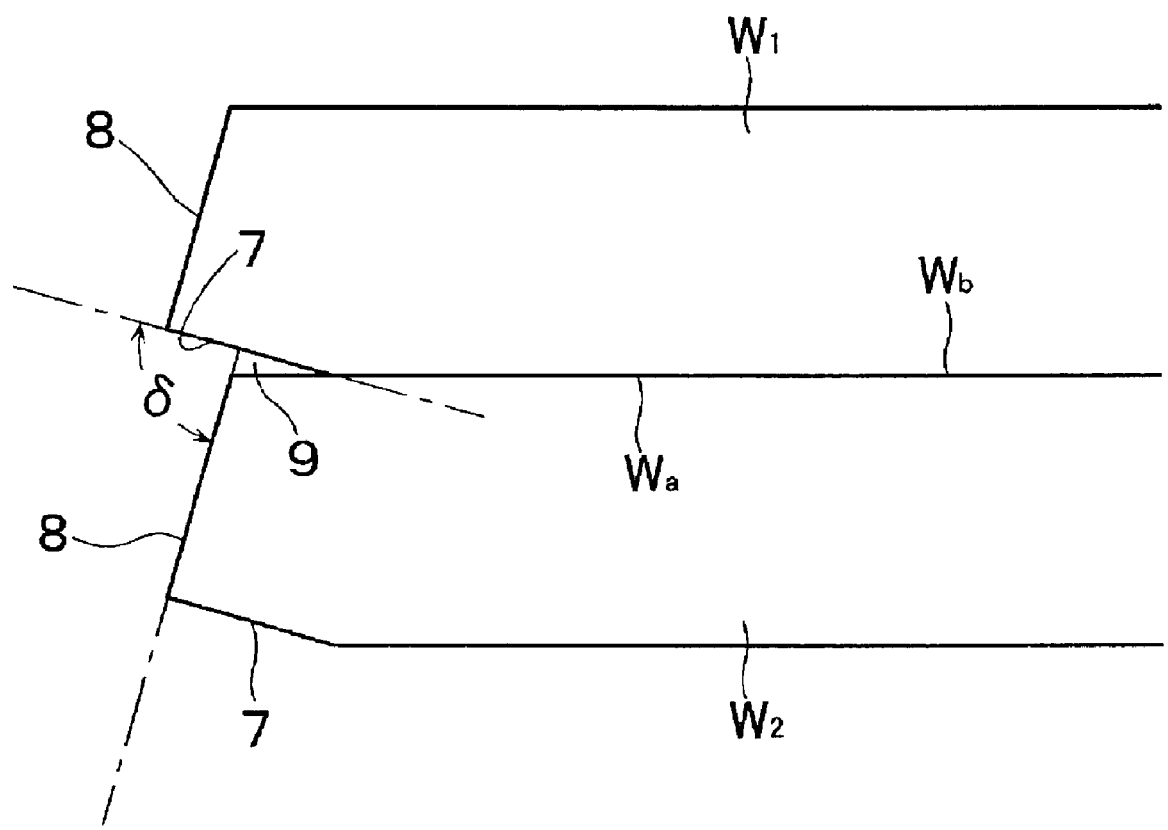
FIG. 12 is a view enlarging to show end portions of works laminated by two sheets.

In order to increase the force F of lifting up the end portion of the plate member, it is preferable to form the first and the second inclined faces 7, 8 as follows. That is, it is preferable to form the first inclined face 7 such that a rate of a height h as compared with a wall thickness t of the plate member W is 15 through 25%. It is preferable to form an angle of inclination $\alpha$ of the first inclined face 7 to be 10 through 20 degrees, and an angle of inclination $\beta$ of the second inclined face 8 to be 10 through 20 degrees, that is, form an angle $\gamma$ made by the first and the second inclined faces 7, 8 to be 80 through 100 degrees. As a result, an angle $\delta$ made by the first and the second inclined faces 7, 8 becomes 80 through 100 degrees between the contiguous plate members $W_1$, $W_2$ (refer to FIGS. 11, 12).

When the rate h/t of the first inclined face 7 is less than 15%, the gap on the lower side of the first inclined face 7 is narrowed, and the warm wind is difficult to advance to the gap. On the other hand, when the rate h/t exceeds 25%, an amount of the first inclined face 7 projected from an upper edge of the lower side plate member $W_2$ is reduced, and therefore, the warm wind blown up from the side of the lower side plate member $W_2$ is made to be difficult to impinge on the first inclined face 7.

Further, when the angle of inclination $\beta$ of the second inclined face 8 exceeds 20 degrees, although the warm wind is made to be easy to flow to the air gap 9, the warm wind skewedly impinges on the first inclined face 7 of the upper side plate member $W_1$, and therefore, the force F of lifting up the end portion of the plate member is reduced. On the other hand, when the angle of inclination β is less than 10 degrees, the warm wind is made to be easy to flow in the horizontal direction and the force F of lifting up the end portion of the plate member is reduced.

Further, the best angle γ of intersecting the first and the second inclined faces 7, 8 is 90 degrees. In this case, the warm wind blown up from the side of the lower side plate member $W_2$ orthogonally impinges on the first inclined face 7 of the upper side plate member $W_1$ and the force F of lifting up the end portion of the plate member is maximized. However, when a working error is taken into consideration, the angle γ may be 80 through 100 degrees with no hazard practically. When the angle β and the angle γ are determined in this way, the angle of inclination α of the first inclined face 7 becomes 10 through 20 degrees.

Further, although according to the above-described embodiment, the suction pads 3 are arranged in the lattice shape (state of being aligned in both longitudinal and lateral directions) to be adsorbed to the surface of the topmost plate member $W_1$, depending on the shape of the plate member W, all of the suction pads 3 may not necessarily be arranged to be aligned in both the longitudinal and the transverse directions.

Further, although according to the above-described embodiments, the plate member W in a quadrangular shape is used, the shape of the plate member W is not limited thereto.

Example

As the plate member W, there is used an aluminum alloy plate having a size of 1000×1700 mm, a thickness of 1 mm coated with a lubricant for pressing. Further, the work is provided with the first and the second inclined faces 7, 8 at an end portion thereof. 15 pieces of the suction pads 3 are arranged to be adsorbed to a surface of the plate member W in vertical 5 rows and horizontal 3 rows at equal intervals of 30 mm. A diameter of the suction pad 3 is 100 mm, and the stroke L of the air cylinder 1 is 30 through 50 mm. The second and third steps are carried out while blowing out warm wind at 30 through 100° C. from the pipe 4.

In an experiment of 150 sheets of the plate members W, a rate of capable of separating the plate members W completely is 97.3%. Although 2 sheets are taken in remaining 2.7%, the plate members W are separated when the air cylinder 1 reaches an upper dead point at the third step.

As a comparative example, an experiment is carried out with regard to the same plate members W by the same method, in this case, the exfoliating member 53 shown in FIG. 8 is used.

In the experiment with regard to 100 sheets of the plate members W, a rate of capable of completely separating the plate members W is 95%. 2 sheets are taken in remaining 5%, and in 2% thereamong, the plate members W are separated at the upper dead point of the air cylinder 1.

The invention claimed is:

1. A method of separating a plate member for separating a topmost plate member from laminated plate members, the method comprising:
   a first step of arranging a plurality of suction devices substantially in a lattice shape to apply a suction force on a surface of a topmost plate member, said suction devices including a plurality of first and second suction devices;
   a second step of holding the topmost plate member by the plurality of first suction devices, which are arranged in a zigzag pattern within the substantially lattice shaped arrangement of the suction devices, and lifting the topmost plate member by the plurality of second suction devices, wherein the second suction devices are mutually exclusive of the first suction devices; and
   a third step of lifting the plurality of first suction devices holding the topmost plate member at the second step.

2. The method of separating a plate member according to claim 1, wherein, in the second and the third steps, the plate member is lifted by the suction devices while a wind injecting device blows wind between the topmost plate member and a second plate member.

3. The method of separating a plate member according to claim 2, wherein a first inclined face continuous to a lower face from an end face of the plate member is formed at a corner portion on a lower side, and a second inclined face continuous to an upper face from the end face of the plate member is formed at a corner portion on an upper side.

4. The method of separating a plate member according to claim 2, wherein the wind is a warm wind having a temperature between 30 and 100° C.

5. The method of separating a plate member according to claim 4, wherein a first inclined face continuous to a lower face from an end face of the plate member is formed at a corner portion on a lower side, and a second inclined face continuous to an upper face from the end face of the plate member is formed at a corner portion on an upper side.

6. The method of separating a plate member according to claim 2, wherein a plurality of wind injecting device is provided, such that at least one wind injecting device is provided on a first side edge of the plate member and at least one wind injecting device is provided on a second side edge of the plate member.

7. The method of separating a plate member according to claim 6, wherein the wind is a warm wind having a temperature between 30 and 100° C.

8. The method of separating a plate member according to claim 7, wherein a first inclined face continuous to a lower face from an end face of the plate member is formed at a corner portion on a lower side, and a second inclined face continuous to an upper face from the end face of the plate member is formed at a corner portion on an upper side.

9. A method of separating a plate member for separating a topmost plate member from laminated plate members, the method comprising:
   a first step of forming a first inclined face continuous to a lower face from an end face of a plate member at a corner portion on a lower side and forming a second inclined face continuous to an upper face from the end face of the plate member at a corner portion on an upper side;
   a second step of arranging suction devices to apply a suction force on a center portion and end portions of the topmost plate member;
   a third step of blowing wind to the end face of the plate member, holding the topmost plate member by the suction device arranged at the center portion of the plate member, and lifting the topmost plate member by remaining ones of the suction devices; and
   a fourth step of lifting the suction device holding the topmost plate member at the third step while blowing the wind to the end face of the plate member.

10. The method of separating a plate member according to claim 9, wherein the wind is a warm wind having a temperature between 30 and 100° C.

11. The method of separating a plate member according to claim 9, wherein the third step includes blowing wind to a plurality of end faces of the plate member.

12. The method of separating a plate member according to claim 11, wherein the wind is a warm wind having a temperature between 30 and 100° C.

13. The method of separating a plate member according to claim 9, wherein the first and second inclined faces formed during the first step are formed by cutting the plate member.

14. The method of separating a plate member according to claim 9, wherein the first and second inclined faces formed during the first step are formed by compressing an end portion of the plate member.

15. The method of separating a plate member according to claim 9, wherein each of the laminated plate members have first and second inclined faces formed according to the first step.

16. The method of separating a plate member according to claim 9, wherein the angle of inclination of the first inclined face is between 10 and 20° relative to the plate member lower face.

17. The method of separating a plate member according to claim 9, wherein the angle of inclination of the second inclined face is between 10 and 20° relative to a vertical plane.

18. The method of separating a plate member according to claim 9, wherein the first inclined face is formed to intersect with the second inclined face such that an angle between the first inclined face and the second inclined face is between 80 and 100°.

19. The method of separating a plate member according to claim 9, wherein an angle formed between the first inclined face of a first plate member and the second inclined face of a second plate member stacked below the first plate member is between 80 and 100°.

* * * * *